United States Patent [19]
Lee et al.

[11] Patent Number: 6,097,529
[45] Date of Patent: Aug. 1, 2000

[54] APPARATUS FOR ENHANCING EXTINCTION RATIO IN OPTICAL NRZ-TO-RZ CONVERTING SYSTEM, AND OPTICAL MODULATION SYSTEM THEREFOR

[75] Inventors: Hyuek Jae Lee; Kwang Joon Kim; Hye Young Kim; Seok Youl Kang, all of Daejeon, Rep. of Korea

[73] Assignee: Electronics and Telecommunications Research Institute, Daejeon, Rep. of Korea

[21] Appl. No.: 09/137,691

[22] Filed: Aug. 21, 1998

[30] Foreign Application Priority Data

Dec. 17, 1997 [KR] Rep. of Korea ...................... 97-69666

[51] Int. Cl.[7] .............................. G02F 1/01; H04B 10/04
[52] U.S. Cl. ........................................... 359/279; 359/184
[58] Field of Search ................................ 359/344, 278, 359/279, 180, 181, 182, 184, 187, 188

[56] References Cited

U.S. PATENT DOCUMENTS

| | | | |
|---|---|---|---|
| 5,434,692 | 7/1995 | Auffret et al. ............................ | 359/158 |
| 5,493,433 | 2/1996 | Prucnal et al. .......................... | 359/123 |
| 5,625,722 | 4/1997 | Froberg et al. ............................. | 385/1 |
| 5,687,021 | 11/1997 | Sotom et al. ............................ | 359/333 |

OTHER PUBLICATIONS

D. Norte et al., "All–Optical TDM–to–WDM Data Format Conversion in a Dynamically Reconfigurable WDM Network", IEEE Photonics Technology Letters, vol. 7, No. 8, Aug. 1995, pp. 920–922.

K.L. Deng et al., "Unbalanced TOAD for Optical Data and Clock Separation in Self–Clocked Transparent OTDM Networks", IEEE Photonics Technology Letters, vol. 9, No. 6, Jun. 1997, pp. 30–32.

Bengt–Erik Olsson et al., "Extinction Ration Improvement Using the Nonlinear Optical Loop Mirror", IEEE Photonics Technology Letters, Vo. 7, No. 1, Jan. 1995, pp. 120–122.

*Primary Examiner*—Margaret Burke
*Attorney, Agent, or Firm*—Jacobson, Price, Holman & Stern, PLLC

[57] ABSTRACT

An apparatus for enhancing the extinction ratio in an optical NRZ-to-RZ converting system, and an optical modulation system, are disclosed. The extinction ratio is improved by using an optical fiber loop mirror together with optical amplifiers. The apparatus for enhancing the extinction ratio includes a variable coupling means for receiving external signals to split them to respective terminals of a loop mirror. A variable optical delaying means delays the phases of the signals after their dispersion by the variable coupling means. An optical amplifying means positioned asymmetrically smaller than a bit time of an RZ signal pattern inputted slightly departed from the center of the loop mirror amplifies the optical intensity, and varies the refractive index so as to cause a phase delay. A polarization adjusting means adjusts the polarization of the optical signals, and an optical band pass filtering means removes noises from signals outputted from the loop mirror. The apparatus is used in an optical NRZ-to-RZ converting system.

3 Claims, 3 Drawing Sheets

APPARATUS FOR ENHANCING EXTINCTION RATIO IN OPTICAL NRZ-TO-RZ CONVERTING SYSTEM, AND OPTICAL MODULATION SYSTEM THEREFOR

BACKGROUND OF THE INVENTION

1. Field of the Invention

The present invention relates to an apparatus for enhancing the extinction ratio in an optical NRZ-to-RZ converting system using an optical fiber loop mirror together with optical amplifiers.

2. Description of the Prior Art

In all optical network to be developed in the future, various multiplexing techniques and data patterns have be accommodated. That is, an optical transparency has to be maintained between the time division multiplexing and the wavelength division multiplexing, and the data patterns have to be arbitrarily converted.

In this case, particularly, the NRZ (non-return to zero) signals and RZ (return to zero) signals are mostly used, and the NRZ signals can be converted to RZ signals by utilizing the cross gain compression of a semiconductor optical amplifier.

The method of utilizing the cross gain compression has the advantage that the structure is simple, but the extinction ratio is limited to the maximum 8 dB. In order to raise the extinction ratio, high intensity pump signals are required, this being problematic.

This will be described in detail referring to FIGS. 1 and 2.

FIG. 1 illustrates the constitution of the cross gain modulation system to which the present invention is applied. FIG. 2 illustrates the characteristic curve showing the gain of the semiconductor optical amplifier of FIG. 1.

As shown in FIG. 1, the system includes: a first optical polarization adjuster 10 for adjusting the polarization of the NRZ signals and furnishing the NRZ signals to an optical coupler 12; a second optical polarization adjuster 11 for adjusting the polarization of the clock pattern signals and furnishing NRZ optical clock pattern signals to the optical coupler 12; the optical coupler 12 receiving the polarization-adjusted signals from the first and second optical polarization adjusters 10 and 11 to supply them to respective terminals; a semiconductor optical amplifier 13 for receiving the signals from the optical coupler 12 to amplify them and to supply them to an optical band pass filter; and the optical band pass filter 14 receiving the signals from the semiconductor optical amplifier 13 to allow only the RZ clock pattern signals to pass through.

As shown in FIG. 2, in spite of the fact that the input optical intensity is gradually increased, the gain of the semiconductor optical amplifier maintains a constant value up to a certain point, and then, the gain gradually decreases from the certain point.

Now the operation of the cross gain modulation system to which the present invention is applied will be described.

The semiconductor optical amplifier 13 receives two inputs from the optical coupler 12. One of them is the NRZ signal optical data of a wavelength 1. The other is the RZ signal optical clock of a wavelength 2. Here, it is assumed that the NRZ optical data are synchronized to the RZ optical clocks.

The portion (the portion A of FIG. 1) where the NRZ signal pattern "1" of the wavelength 1 is overlapped with the RZ signal clock pattern of the wavelength 2 shows an increased optical intensity. Therefore, in this portion, the gain is not high, and therefore, weak beams are outputted.

On the other hand, the portion (the portion B of FIG. 2) where the NRZ signal pattern "0" of the wavelength 1 is overlapped with the RZ optical clock pattern of the wavelength 2 receives a large gain in the relative terms, and therefore, intense beams are outputted from this portion.

Therefore, the optical band pass filter 14 which is connected to the last terminal of FIG. 1 extracts the beams of the wavelength 2. Under this condition, the RZ signal pattern of the wavelength 2 which has a value opposite to the NRZ signal pattern is outputted.

In the above described conventional technique, the gain characteristics of the semiconductor optical amplifier are utilized, and therefore, the outputted RZ pattern "0" cannot be completely erased. That is, the extinction ratio is not acceptable.

Further, in order to completely erase, the beam intensity of the NRZ signal pattern of the wavelength 1 has to be enormously high.

Further, in the case where the beam intensity of the incoming NRZ signal pattern fluctuates, the beam intensity of the modulated RZ pattern is very much affected.

SUMMARY OF THE INVENTION

The present invention is intended to overcome the above described disadvantages of the conventional technique.

Therefore it is an object of the present invention to provide an apparatus for enhancing the extinction ratio in an optical NRZ-to-RZ converting system, and an optical modulation system using it, in which an optical fiber loop mirror together with semiconductor optical amplifiers is used.

In achieving the above object, the apparatus for enhancing the extinction ratio in an optical NRZ-to-RZ converting system according to the present invention includes: an variable coupling means for receiving external signals to split them to respective terminals of a loop mirror with arbitrary splitting ratio; a variable optical delay lines means for controlling the time delay of the signals. An optical amplifying means positioned asymmetrically smaller than a bit time of an RZ signal pattern inputted slightly departed from the center of the loop mirror, to amplify the optical intensity, and to vary the refractive index so as to cause a phase delay; a polarization adjusting means for adjusting the polarization of the optical signals; and a optical band pass filtering means for removing noises from signals outputted from the loop mirror.

In another aspect of the present invention, the optical modulation system according to the present invention includes: a first optical amplifying means for receiving an RZ optical data pattern and an NRZ optical data pattern from external to amplify the optical intensity; an optical isolating means for isolating the reflected signals after their reflection by an optical fiber loop mirror; a first filtering means for removing an NRZ signal pattern from among signals inputted from the optical amplifying means; and an extinction ratio improving means for receiving the output of the first filtering means to split them to respective terminals of the loop mirror, to amplify the intensities of the split signals, and to vary the refractive indices so as to improve the extinction ratio.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

The preferred embodiment of the present invention will be described referring to FIGS. 3 and 4.

Figure 1:
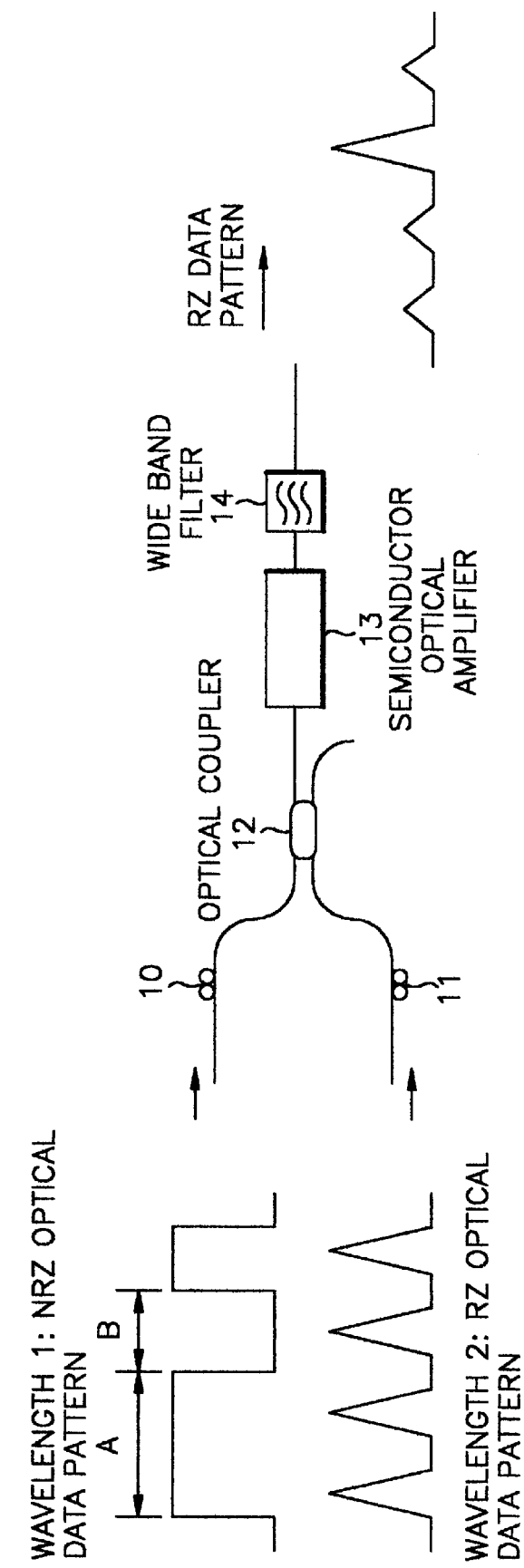
FIG. 1 illustrates the constitution of the cross gain modulation system to which the present invention is applied.
Figure 2:
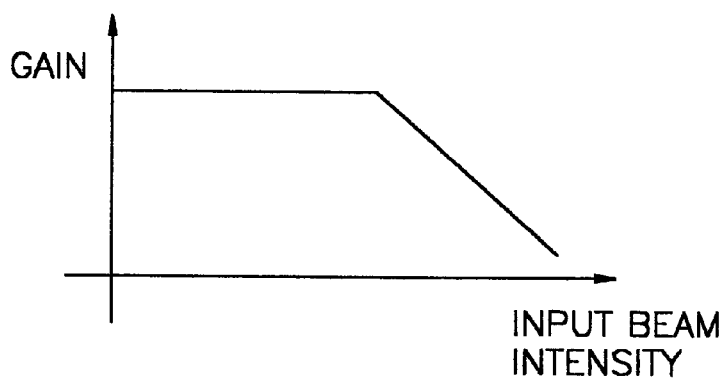
FIG. 2 illustrates the characteristic curve showing the gain of the semiconductor optical amplifier of FIG. 1.
Figure 3:
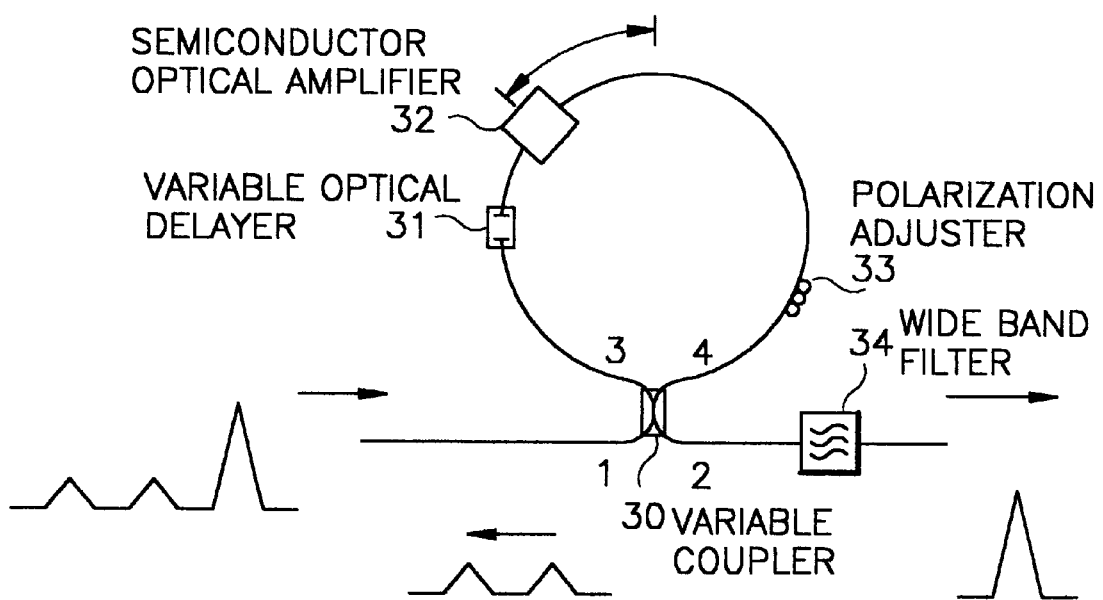
FIG. 3 illustrates the constitution of the apparatus for enhancing the extinction ratio in the optical modulation system according to the present invention.

FIG. 3 illustrates the constitution of the apparatus for enhancing the extinction ratio in the optical modulation system according to the present invention.

As shown in the drawing, the apparatus for enhancing the extinction ratio in an optical NRZ-to-RZ converting system according to the present invention includes: a variable coupler 30 for receiving signals from a first terminal to split them to respective terminals of a loop mirror; a variable optical delay line 31 for delaying the phases of the signals after their dispersion by the variable coupler 30; an optical amplifier 32 positioned asymmetrically so as to cause a phase delay of a counterclockwise pulse with respect to a clockwise pulse, the phase delay being smaller than a bit time of an RZ signal pattern inputted slightly departed from the center of the loop mirror, to amplify the optical intensity, and to vary the refractive index so as to cause a phase delay; a polarization controller 33 for adjusting the polarization of the optical signals; and a optical band pass filter 34 for removing noises from the signals outputted from the loop mirror.

Now the apparatus for enhancing the extinction ratio according to the present invention will be described as to its operations.

As shown in the drawing, it will be assumed that RZ signal patterns of different beam intensities are inputted into the first terminal.

First, the beams having a high beam intensity are divided into two sets of beams by the variable coupler 30. An amount of beams as much as an α (<0.5) -multiple of the input beams is outputted to a third terminal, while an amount of beams as much as 1-α -multiple of the input beams is outputted to a fourth terminal.

The beams which have gone to a third terminal undergo a phase delay, and arrive at the semiconductor optical amplifier 32 earlier than the signals coming from the fourth terminal.

The optical amplifier 32 amplifies the beams of the third terminal to a higher intensity than the beams from the fourth terminal. Further, it varies the refractive index to delay the phase of the signals of the fourth terminal much more.

Therefore, when the two sets of the beams encounter again after circulating the loop mirror, their beam intensities are made to have opposite phases, and they are outputted to a second terminal.

Meanwhile, when the beams of the weak intensity are inputted into the first terminal, the semiconductor optical amplifier 32 cannot perform the above described function, but performs like the ordinary loop mirror, with the result that all the beams are outputted to the first terminal.

Therefore, the beams of high intensity are transferred to the second terminal, while the beams of low intensity are transferred to the first terminal.

Figure 4:
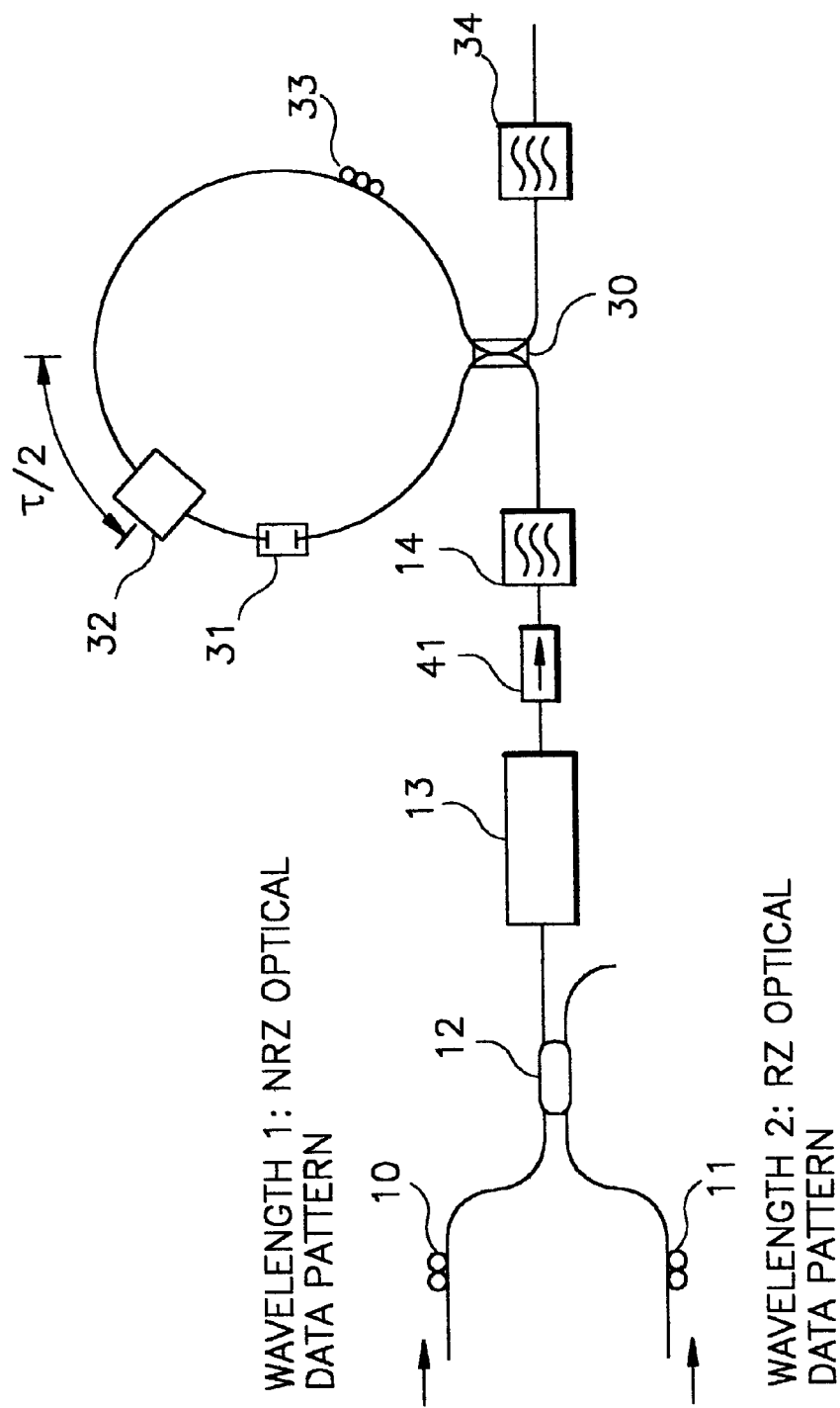
FIG. 4 illustrates the constitution of the NRZ-to-RZ converting system according to the present invention.

FIG. 4 illustrates the constitution of the NRZ-to-RZ converting system according to the present invention.

As shown in the drawing, the optical modulation system includes: a first polarization controller 10 for receiving an NRZ optical data pattern from the external to polarize them and to supply them to an optical coupler 12; a second polarization controller 11 for receiving the NRZ optical data pattern from the external to polarize them and to supply them to the optical coupler 12; an optical coupler 12 for receiving the signals from the first and second polarization adjusters 10 and 11 to supply them to a first semiconductor optical amplifier 13; the first semiconductor optical amplifier 13 receiving the signals from the optical coupler 12 to amplify the optical intensity; an optical isolator 41 for obstructing the passing of the signals after their reflection by the optical fiber loop mirror; a first optical band pass filter 14 for removing the NRZ signal pattern coming from the first semiconductor optical amplifier 13 to remove noises: a variable coupler 30 for receiving the signals from the first wide band filter 14 to split the signals to respective terminals of the loop mirror; a variable optical delay line 31 for delaying the phases of the signals after their dispersion by the variable coupler 30 to adjust the position of the semiconductor optical amplifier 32 within the loop; a second semiconductor optical amplifier 32 positioned asymmetrically so as to cause a phase delay of a counterclockwise pulse with respect to a clockwise pulse, the phase delay being smaller than a bit time of an RZ signal pattern inputted slightly departed from the center of the loop mirror, to amplify the optical intensity, and to vary the refractive index so as to cause a phase delay; a third polarization controller 33 for adjusting the polarization of the optical signals; and a second wide band filter 34 for removing noises from among the signals of the loop mirror.

Now the optical NRZ-to-RZ converting system will be described as to its operations.

A first input terminal receives the NRZ optical pattern of the wavelength 1, while a second input terminal receives the RZ optical clock pattern of the wavelength 2.

These two sets of signals pass through the first and second polarization controllers 10 and 11 to be merged together by the optical coupler 12.

The merged beams are made to undergo a cross gain modulation by the first semiconductor optical amplifier 13.

The RZ signals of the wavelength 2 are extracted by the first band pass filter 14, but these signals had been subjected to the cross gain modulation, and therefore, an inverted RZ pattern is obtained.

Under this condition, the extinction ratio of the obtained RZ pattern is decided by the optical intensity of the first input, and there is the disadvantage that the extinction ratio has a limited value.

The RZ pattern thus obtained is supplied through the variable coupler 30 into the loop mirror, and the operation of the incident beams are as described above.

That is, the high intensity beams are transferred to the output side, while the weak beams are reflected. The reflected beams are prevented from being transferred toward the first optical amplifier 13 by the optical isolator 41.

Meanwhile, the second band pass filter 34 of the output side performs the function of removing the amplification spontaneous emission noises coming from the second optical amplifier 32.

Therefore, finally an RZ pattern having an improved extinction ratio at the output terminal is obtained.

In the above, the present invention was described based on the specific embodiment, but it should be apparent to those ordinarily skilled in the art that there can be added many changes and modifications without departing from the scope and the technical conception of the present invention. Therefore, the present invention will not be limited to the specific preferred embodiment.

According to the present invention as described above, the extinction ratio of the optical modulation system can be improved by using an optical loop mirror together with optical amplifiers.

What is claimed is:

1. An apparatus for enhancing an extinction ratio in an optical NRZ-to-RZ converting system, comprising:

a variable coupling means for receiving external optical signals and splitting them to respective terminals of a loop mirror with a predetermined coupling ratio;

a variable optical delaying means for delaying phases of the optical signals split by said variable coupling means;

an optical amplifying means for amplifying an optical intensity and varying a refractive index, the optical amplifying means being positioned asymmetrically so as to cause a phase delay of a counterclockwise pulse with respect to a clockwise pulse, the phase delay being smaller than a bit time of an RZ signal pattern inputted slightly departed from a center of said loop mirror;

a polarization adjusting means for adjusting a polarization of optical signals splitted by said variable coupling means; and an optical band pass filtering means for removing noises from signals outputted from said loop mirror.

2. An optical modulation system comprising:

a first optical amplifying means for receiving an RZ optical data pattern and an NRZ optical data pattern externally and amplifying an optical intensity;

an optical isolating means for isolating signals reflected by an optical fiber loop mirror;

a first filtering means for removing an NRZ signal pattern from signals inputted from said optical amplifying means; and an extinction ratio improving means for receiving an output of said first filtering means, splitting them to respective terminals of said loop mirror, amplifying intensities of the split signals, and varying refractive indices.

3. The optical modulation system as claimed in claim 2, wherein said extinction ratio improving means comprises:

a variable coupling means for receiving signals from said first band pass filtering means and splitting signals to respective terminals of said loop mirror;

a variable optical delaying means for delaying phases of signals split by said variable coupling means and adjusting a position of said semiconductor optical amplifying means within said loop;

a second optical amplifying means for amplifying an optical intensity and varying a refractive index, the second optical amplifying means being positioned asymmetrically so as to cause a phase delay of a counterclockwise pulse with respect to a clockwise pulse, the phase delay being smaller than a bit time of an RZ signal pattern inputted slightly departed from a center of said loop mirror;

a first polarization adjusting means for receiving an NRZ optical data pattern externally, polarizing them and supplying them to an optical coupling means; and a second filtering means for removing noises from signals outputted from said loop mirror.

* * * * *